(12) United States Patent
Hirakawa et al.

(10) Patent No.: US 8,129,048 B2
(45) Date of Patent: Mar. 6, 2012

(54) METHOD FOR PRODUCING RECTANGULAR FLAT SECONDARY BATTERY

(75) Inventors: Yasushi Hirakawa, Osaka (JP); Takayuki Shirane, Osaka (JP)

(73) Assignee: Panasonic Corporation, Osaka (JP)

( * ) Notice: Subject to any disclaimer, the term of this patent is extended or adjusted under 35 U.S.C. 154(b) by 1163 days.

(21) Appl. No.: 11/919,505

(22) PCT Filed: Feb. 1, 2007

(86) PCT No.: PCT/JP2007/051702
§ 371 (c)(1),
(2), (4) Date: Oct. 29, 2007

(87) PCT Pub. No.: WO2007/097172
PCT Pub. Date: Aug. 30, 2007

(65) Prior Publication Data
US 2009/0077794 A1 Mar. 26, 2009

(30) Foreign Application Priority Data
Feb. 21, 2006 (JP) .................................. 2006-043367

(51) Int. Cl.
*H01M 4/13* (2010.01)
(52) U.S. Cl. ..................... 429/209; 429/129; 429/186
(58) Field of Classification Search .................. 429/186, 429/208, 129, 130
See application file for complete search history.

(56) References Cited

U.S. PATENT DOCUMENTS

| | | | | |
|---|---|---|---|---|
| 6,485,859 | B1 * | 11/2002 | Szyszkowski | 429/66 |
| 2003/0017386 | A1 * | 1/2003 | Daido et al. | 429/142 |
| 2004/0241548 | A1 | 12/2004 | Nakamoto et al. | |
| 2006/0019161 | A1 * | 1/2006 | Issaev et al. | 429/209 |

FOREIGN PATENT DOCUMENTS

| | | |
|---|---|---|
| JP | 4-296467 | 10/1992 |
| JP | 6-203870 | 7/1994 |
| JP | 8-055637 | 2/1996 |
| JP | 11-097055 | 4/1999 |
| JP | 2000-156240 | 6/2000 |
| JP | 2002-042741 | 2/2002 |
| JP | 2002-198102 | 7/2002 |
| JP | 2004-319469 | 11/2004 |

* cited by examiner

*Primary Examiner* — Barbara Gilliam
*Assistant Examiner* — Zachary Best
(74) *Attorney, Agent, or Firm* — McDermott Will & Emery LLP

(57) ABSTRACT

A positive electrode plate and a negative electrode plate are spirally wound with a separator interposed therebetween to form an electrode group 3 having a circular shape or an oval shape. Next, a center core member 2 for applying a pressure to the electrode group 3 is inserted in a winding core hole 6 of the electrode group 3. Thereafter, the electrode group 3 is deformed into a flat shape. Then, the flat electrode group 3 is accommodated in a rectangular flat armoring can 4 with a base and an opening portion of the armoring can 4 is sealed, thereby producing a rectangular flat secondary battery.

8 Claims, 3 Drawing Sheets

FIG. 4

| | | Negative electrode active material | Material of case | Center core | | | | Battery internal resistance after 100 cycle (mΩ) |
|---|---|---|---|---|---|---|---|---|
| | | | | With/without | Shape | Material | Modulus of longitudinal elasticity (GPa) | |
| Working examples | 1 | Graphite | Aluminum | With | Approximately C-shape | SUP | 210 | 48.9 |
| | 2 | Graphite | Aluminum | With | Approximately C-shape | Polypropylene | 4.5 | 49.5 |
| | 3 | Graphite | Aluminum | With | Plate-shape | PVDF | – | 49.8 |
| | 4 | Graphite | Aluminum | With | Spring | SUP | – | 48.2 |
| | 5 | Graphite | Aluminum | With | Plate-shape (wedge) | PVDF | – | 49.9 |
| | 6 | Carbon coating SiO | Aluminum | With | Approximately C-shape | SUP | 210 | 50.4 |
| | 7 | TiSi2 | Aluminum | With | Approximately C-shape | SUP | 210 | 49.9 |
| Comparative examples | 1 | Graphite | Aluminum | Without | – | – | – | 53.6 |
| | 2 | Graphite | Laminated film (bag) | With | Approximately C-shape | SUP | 210 | 97.7 |
| | 3 | Carbon coating SiO | Aluminum | Without | – | – | – | 122.4 |
| | 4 | TiSi2 | Aluminum | Without | – | – | – | 111.4 |

US 8,129,048 B2

METHOD FOR PRODUCING RECTANGULAR FLAT SECONDARY BATTERY

TECHNICAL FIELD

The present invention relates to a method for producing a rectangular flat secondary battery with excellent stability in battery properties and high capacity.

BACKGROUND ART

In recent years, more and more portable or cordless household electronic appliances have been used. With reduction in size and weight of electronic appliances, nonaqueous electrolyte secondary batteries such as nickel cadmium battery, nickel-metal hydride battery, small sealed lead acid storage battery and the like have come into use as a power supply for driving electric appliances. In a nonaqueous electrolyte secondary battery, in order to achieve highly efficient charge and discharge performance, a positive electrode plate and a negative electrode plate are spirally wound with a separator interposed therebetween to form an electrode group in general.

As the size and weight of electronic appliances have been reduced, in view of effectively utilizing a space of an electronic appliance, a rectangular flat shape has been adopted for secondary batteries and lightweight alloy such as aluminum and the like has been used as a material for armoring cans.

However, when a charge and discharge cycle of a battery is repeated, an internal pressure is applied to an armoring can due to swelling of an electrode group or the like. In the case of a cylindrical battery, an internal pressure is uniformly applied to an entire side of an armoring can. In the case of a rectangular flat battery, however, a problem arises in which pressure-resisting strength of an armoring can is low at its long side surface, so that the long side surface swells.

To cope with this problem, in Patent Reference 1, a technique in which a concave portion is formed in a long side surface of an armoring can is proposed. Specifically, by forming a concave portion in a long side surface of an armoring can, an internal pressure applied to the long side surface is uniformed and thus swelling in the long side surface of the armoring can prevented.

However, swelling of an electrode group occurring due to repetition of a charge and discharge cycle of a battery causes another problem, i.e., internal resistance of the battery is increased. It is considered that this problem arises because a void (winding core hole) is left in a center portion of the electrode group after removing a winding core and part of the electrode plates deflects due to swelling of the electrode group, so that a distance between electrode plates is increased.

To solve the above-described problem, in Patent Reference 2, a method in which an elastic body is inserted in a winding core hole after removal of a winding core is proposed. Specifically, the elastic body inserted in the winding core hole applies a pressure to an electrode group to prevent deflection of the electrode group toward the winding core hole is prevented, so that increase in internal resistance is prevented. The member inserted in the winding core hole is an elastic body and the elastic body has the function of absorbing swelling of the electrode group. Therefore, swelling of an armoring can be prevented as well.

Patent Reference 1: Japanese Laid-Open Publication No. 2002-042741

Patent Reference 2: Japanese Laid-Open Publication No. H8-055637

DISCLOSURE OF THE INVENTION

Problems that the Invention is to Solve

The method described in Patent Reference 2, in which an elastic body is inserted in a winding core hole is excellent in the point of preventing increase in internal resistance due to deflection of an electrode plate. However, in rectangular flat batteries, even when the elastic boy is inserted, there have been cases where internal resistance is increased or a large variation of internal resistance is exhibited. Specifically, it has been found that when a compound of Si, Sn or the like (for example, SiO, $TiSi_2$ or the like) is used as an active material of a negative electrode, the problem becomes notable.

An active material made of a compound of Si or the like has a larger theoretical capacity than that of a carbon material such as graphite and therefore it is suitable to such active materials to increase a capacity of a battery. However, such an active material largely expands and shrinks. Therefore, the increase in internal resistance or variation is caused as a result of increase in the degree of swelling of the electrode group, and thus the problem of swelling of deflection of an electrode plate again has become notable.

In the above-described view, the present invention has been devised and it is therefore an object of the present invention to provide a method for manufacturing a high capacity rectangular flat secondary battery in which increase in internal resistance of the battery is suppressed.

Solution to the Problems

The present inventors focused on an assembly step for a rectangular flat battery as a reason why increase and variation in internal resistance occur even when an elastic body is inserted in a winding core hole of an electrode group.

A rectangular flat battery is assembled in the following manner. A positive electrode plate and a negative electrode plate are spirally wound with a separator interposed therebetween to form an electrode group having a circular or oval shape, the electrode group is compressed to be deformed into a flat shape, and then the flat electrode group is accommodated in a rectangular flat armoring can with a base, thereby assembling a rectangular flat battery. If the electrode group is not spirally wound in a constant state because of variations in winding pressure and the like, a compression pressure to be applied to each member of the electrode group might vary. In such a case, an excessive compression pressure is locally applied to the electrode group, thus the electrode group might be possibly deflected in part to which an excessive compression pressure is applied.

As has been described, it is considered that when, besides deflection (which will be hereafter referred to as "deflection in charging/discharging") of an electrode plate caused by swelling of an electrode group in charging/discharging a battery, deflection (which will be hereafter referred to as "initial deflection") of an electrode plate caused by compression of an electrode group in an assembly step occurs, the electrode plate deflection is promoted with the initial deflection as a starting point, so that internal resistance is increased or varies. In such a situation, the electrode plate deflection can not be suppressed only by the known method in which an elastic body is inserted in a winding core hole. However, conventionally, in dealing with increase and variation in internal resistance caused by deflection of an electrode plate, the initial deflection of an electrode plate has not been considered at all.

Based on the above-described finding, the present inventors believed that to reduce increase and variation in internal resistance, it is necessary to prevent the generation of the initial deflection of an electrode plate. Thus, in the assembly step for a rectangular flat secondary battery, the present inventors adopted a method in which with a center core member for applying a pressure (i.e., force working in the direction to expand a winding core hole) inserted in an electrode group, the electrode group is compressed and deformed into a flat shape.

Specifically, a method for producing a rectangular flat secondary battery according to the present invention is characterized by including the steps of: a) spirally winding a positive electrode plate and a negative electrode plate with a separator interposed therebetween, thereby forming an electrode group having a circular shape or an oval shape; b) inserting a center core member for applying a pressure to the electrode group in a winding core hole of the electrode group; c) compressing the electrode group to deform the electrode group into a flat shape; d) accommodating the flat electrode group in a rectangular flat armoring can with a base; and e) sealing an opening portion of the armoring can.

According to the method, in the electrode group compressing step c), a center core member for applying a pressure to an electrode group is inserted, so that initial deflection of an electrode plate, which conventionally occurs when the electrode group is compressed, can be prevented. Thus, increase or variation in internal resistance due to repetition of a charge and discharge cycle can be suppressed.

The above-described effects are remarkably exhibited particularly in a rectangular flat secondary battery in which a negative electrode substance formed on the negative electrode plate is made of a compound containing at least one of Si and Sn.

To prevent the occurrence of deflection of an electrode plate in compressing the electrode group, it is preferable that the center core member is made of an elastic body having a plate shape and a Young's modulus of $2.0 \times 10^{-3}$ GPa or more.

Effects of the Invention

According to the present invention, with a center core member for applying a pressure to an electrode group inserted in a winding core hole of the electrode group, the electrode group is compressed and deformed into a flat shape. Thus, the occurrence of deflection of an electrode plate in compressing the electrode group can be prevented. Accordingly, a high capacity rectangular flat secondary battery in which increase in internal resistance of the battery is suppressed can be achieved.

BRIEF DESCRIPTION OF THE DRAWINGS

FIG. 4 is a table showing evaluation results for internal resistance in each of embodiments of the present invention.

EXPLANATION OF REFERENCE NUMERALS

Figure 1A:
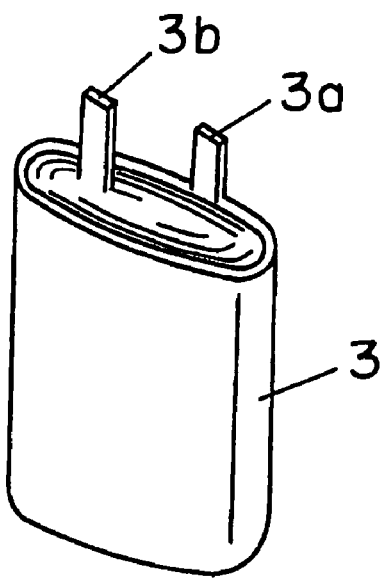
FIG. 1(A) is a schematic view illustrating a structure of an electrode group according to an embodiment of the present invention.

1 Sealing plate
1a Injection hole
2 Center core member
3 Spring
3a Positive electrode lead
3b Negative electrode lead
4 Armoring can (case)
5 Terminal
5a, 5b Electrode lead
6 Winding core hole

BEST MODE FOR CARRYING OUT THE INVENTION

Hereafter, embodiments of the present invention will be described with reference to the accompanying drawings. For simplification of description, each component having substantially the same function is identified by the same reference numeral. Note that the present invention is not limited to the following embodiments.

Figure 1B:
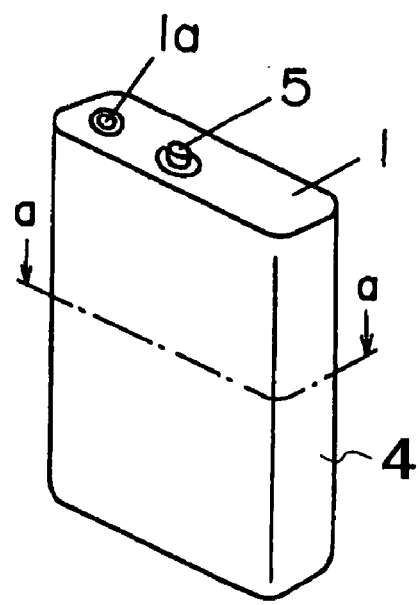
FIG. 1(B) is a schematic view illustrating a structure of a rectangular flat secondary battery in which an electrode group is inserted in an armoring can.
Figure 1C:
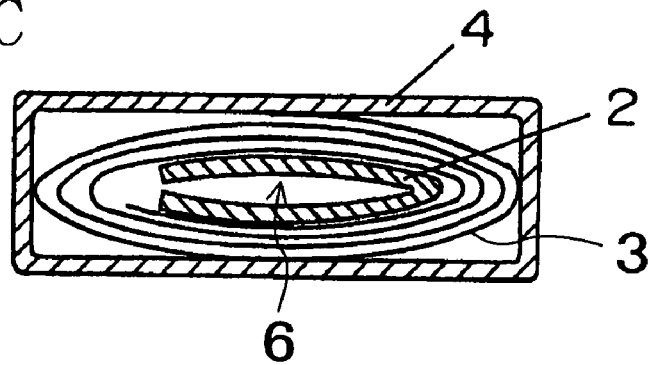
FIG. 1(C) is a cross-sectional view taken along the line a-a of FIG. 1(B).

FIG. 1(A) is a schematic view illustrating an electrode group 3 deformed into a flat shape according to this embodiment. FIG. 1(B) is a schematic view illustrating a rectangular flat secondary battery in which the electrode group 3 is inserted in an armoring can (case) 4. FIG. 1(C) is a cross-sectional view taken along the line a-a of FIG. 1(B).

A rectangular flat secondary battery is produced in the following steps. First, a positive electrode plate and a negative electrode plate are spirally wound with a separator interposed therebetween to form an electrode group 3 having a circular shape or an oval shape. Next, a center core member 2 for applying a pressure to the electrode group 3 is inserted in a winding core hole 6 of the electrode group 3. Thereafter, the electrode group 3 is compressed and thereby is deformed into a flat shape. Then, the flat electrode group 3 is accommodated in a rectangular flat armoring can 4 with a base and, finally, an opening portion of the armoring can 4 is sealed, thereby completing a rectangular flat secondary battery.

As shown in FIG. 1(A), a positive electrode lead 3a and a negative electrode lead 3b are connected to the positive electrode plate and the negative electrode plate of the electrode group 3, respectively. As shown in FIG. 1(B), one of the positive electrode lead 3a and the negative electrode lead 3b is connected to a terminal 5 of the armoring can 4 and the other is connected to the armoring can 4. After the electrode group 3 has been accommodated in the armoring can 4, an electrolyte is injected thereinto through an injection hole 1a and then the opening portion of the armoring can 4 is sealed with a sealing plate 1.

According to the method for producing a rectangular flat secondary battery in accordance with this embodiment, the center core member 2 for applying a pressure to the electrode group 3 is inserted in the winding core hole 6 of the electrode group 3. Thus, when the electrode group 3 wound in the form of a circular shape or an oval shape compressed to be deformed into a flat shape, initial deflection of an electrode plate, which is conventionally caused in a compression step, can be prevented. Therefore, increase or variation in internal resistance due to repetition of a charge and discharge cycle can be effectively suppressed.

A negative electrode active material formed on the negative electrode plate is made of a compound containing at least one of Si and Sn, thereby preventing the occurrence of initial deflection of an electrode plate even when expansion and shrinkage of its volume which occur along with charge and discharge of the battery. Thus, deflection of an electrode plate in charging/discharging is not promoted and the effect of suppressing increase and variation in internal resistance according to the present invention can be more remarkably exhibited.

In this case, as a compound containing Si, $SiO_x$ ($0.05<x<1.95$), an alloy, a compound, a solid solution or the like of Si or $SiO_x$ in which part of Si is replaced with an element such as B, Mg, Ni, Ti, Mo, Co, Ca, Cr, Cu, Fe, Mn, Nb, Ta, V, W, Zn, C, N or Sn can be used. As a compound containing Sn, $Ni_2Sn_4$, $Mg_2Sn$, $SnO_x$ ($0<x<2$), $SnO_2$, $SnSiO_3$, LiSnO or the like can be used.

To prevent the occurrence of deflection of an electrode plate in compressing the electrode group 3, it is preferable that the center core member 2 to be inserted in the winding core hole 6 of the electrode group 3 is made of a plate-shape elastic body having a Young's modulus of $2.0 \times 10^{-3}$ GPa or more.

There is no particular limitation for the center core member 2 to be inserted in the winding core hole 6 of the electrode group 3, and a shape, a material and the like can be appropriately selected for the center core member 2 within a range which exhibits the effects of the present invention. For example, the effects of the present invention can be appropriately exhibited by using the following shape and material for the center core member 2.

For example, as a plate-shape elastic body, a material (for example, polyvinylidene fluoride (PVDF), styrene-butadiene copolymer (SBR), acrylonitrile butadiene styrene copolymer and the like) which absorbs an electrolyte and swells can be used. Such a material has a Young's modulus of $2.0 \times 10^{-3}$ GPa or more and thus the occurrence of deflection of an electrode plate in compressing the electrode group 3 can be prevented. Also, such a material absorbs an electrolyte and swells after the electrode group 3 has been accommodated in the armoring can 4, and thus the occurrence of deflection of an electrode plate in charging/discharging can be effectively suppressed.

Figure 3:
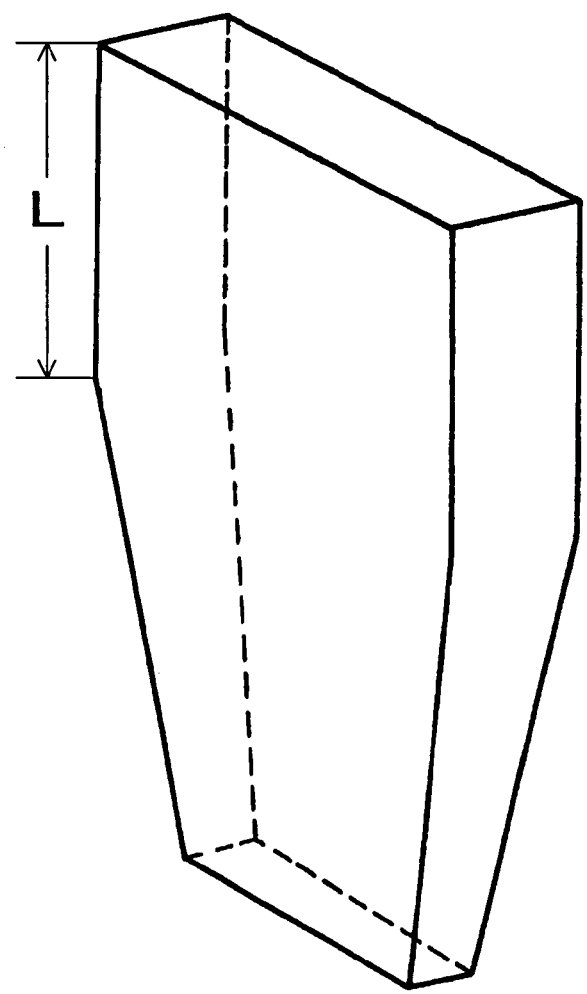
FIG. 3 is a cross-sectional view illustrating another exemplary structure of a center core member according to an embodiment of the present invention.

As shown in FIG. 3, a plate-shape elastic body may be formed to have a wedge shape. If the center core member 2 has such a wedge shape, the center core member 2 can be easily inserted in the winding core hole 6. Also, as shown in FIG. 3, a length of a straight line L (which is part serving to expand the winding core hole 6 of the electrode group 3) of the wedge shape is preferably 50% or more of the entire length (in the axis direction of the winding core hole 6) of the center core member 2.

When the center core member 2 is made of a plate-shape elastic body, the elastic body preferably has a Young's modulus not exceeding 210 GPa. If the elastic body has a larger Young's modulus than 210 GPa, the elastic body does not absorb swelling of an electrode group and thus an armoring can might swell. Therefore, an elastic body having a larger Young's modulus than 210 GPa is not preferable.

Figure 2:
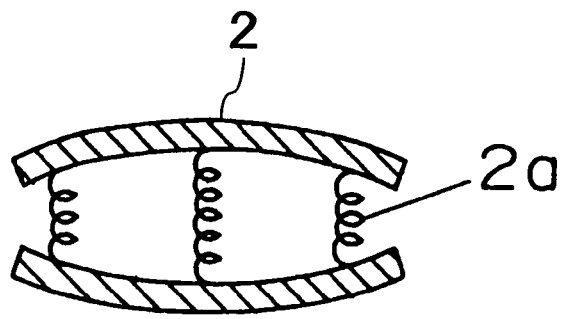
FIG. 2 is a cross-sectional view illustrating an exemplary structure of a center core member according to an embodiment of the present invention.

When the center core member 2 does not have a plate-shape, for example, as shown in FIG. 1(C), the center core member 2 may be formed of an elastic body with a C-shape. As shown in FIG. 2, the center core member 2 may be configured to include a member having springs 2a for applying a pressure to the electrode group 3. The center core member 2 having one of the above-described configurations serves to expand the winding core hole 6 of the electrode group 3 and the effects of the present invention can be achieved.

To ideally achieve the effects of the present invention, the center core member 2 preferably has a width corresponding to 80% or more of a width of the winding core hole 6 of the electrode group 3 in the flattening direction.

Hereafter, working examples in which the present invention is applied to a lithium ion secondary battery will be described.

WORKING EXAMPLE 1

(a) Forming of Positive Electrode Plate

A positive electrode mixture including lithium cobaltate as an active material, PVDF as a binder and acetylene black as a conducting agent was applied to an aluminum foil as a current collector and dried. The positive electrode mixture dried on the aluminum foil was rolled and then was cut so as to have a width of 29.5 mm. Thus, a hoop of a positive electrode plate was obtained.

(b) Forming of Negative Electrode Plate

A negative electrode mixture including artificial graphite as an active material, SBR as a binder and carboxymethyl cellulose as a thickener was applied to a copper foil as a collector and dried. The negative electrode mixture dried on the copper foil was rolled and then was cut so as to have a width of 30.6 mm. Thus, a hoop of a negative electrode plate was obtained.

(c) Adjustment of Electrolyte 1M of $LiPF_6$ was dissolved in a nonaqueous mixed solvent containing ethylene carbonate, ethyl methyl carbonate and diethyl carbonate (in a volume ratio of 3:5:2), thereby preparing an electrolyte.

(d) Fabrication of Battery

Using the above-described positive electrode plate, negative electrode plate and electrolyte, a rectangular flat secondary battery having a length of 36 mm, a width of 34 mm and a thickness of 5.0 mm was produced.

First, the positive electrode plate hoop and the negative electrode plate hoop were cut so that each of the hoop has a predetermined length, and were used as a positive electrode plate and a negative electrode plate, respectively. A mixture layer on each of the positive electrode plate and the negative electrode plate was partially removed and a positive electrode lead 3a and a negative electrode lead 3b were connected. A separator having a thickness of 20 μm and made of a polyethylene resin microporous membrane sheet was provided between the positive electrode plate and the negative electrode plate. Then, the positive electrode plate, the negative electrode plate and the separator all together were spirally wound to form an electrode group 3 (with a theoretical capacity of 700 mAh) of FIG. 1(A), having an oval spirally wound shape with a length of 33.5 mm, a width of 32.7 mm and a thickness of 4.25 mm.

A center core member 2 (with a length of 30 mm, a width of 26.4 mm, a thickness of 0.3 mm and a Young's modulus of 210 GPa) formed of spring steel having a thickness of 0.1 mm and an approximately C-shape was inserted in a winding core hole 6 of the electrode group 3, as shown in FIG. 1(C).

Thereafter, the electrode group 3 was compressed and accommodated in an aluminum case with a length of 34.6 mm, a width of 33.1 mm and a thickness of 4.6 mm and the case 4 and a sealing plate 1 were welded and sealed by laser. Then, the electrolyte in an amount of 1.9 g was injected therein through an injection hole 1a of the sealing plate 1 and the injection hole was closed, thereby completing a rectangular flat lithium ion secondary battery of FIG. 1(B). Note that electrode leads 5a and 5b were welded so as to be connected to the sealing plate 1 and a terminal 5, respectively, before closing the injection hole by laser.

WORKING EXAMPLE 2

In contrast to Working Example 1, as a material of the center core member 2, polypropylene (with a Young's modulus of 4.5 GPa) was used. Other than that, a lithium ion secondary battery was produced in the same manner as in Working Example 1.

WORKING EXAMPLE 3

In contrast to Working Example 1, as a material of the center core member 2, PVDF (with a Young's modulus of $2.0 \times 10^{-3}$ GPa) was used. Furthermore, the center core member 2 was formed so as to have the same dimensions as those in Working Example 1 but have a plate-shape. Other than that, a lithium ion secondary battery was produced in the same manner as in Working Example 1.

WORKING EXAMPLE 4

In contrast to Working Example 1, the center core member 2 was formed so as to have the same dimensions as those in Working Example 1 but has a structure of FIG. 2 including springs 2a. Other than that, a lithium ion secondary battery was produced in the same manner as in Working Example 1.

WORKING EXAMPLE 5

In contrast to Working Example 3, a maximum dimension of the center core member 2 was not changed but the center core member 2 was formed so as to have a structure of FIG. 3 (with a width of 22.7 mm and a thickness of 0.1 mm). Other than that, a lithium ion secondary battery was produced in the same manner as in Working Example 1.

WORKING EXAMPLE 6

In contrast to Working Example 1, SiO coating carbon fiber was used as a negative electrode active material and polyacrylic acid was used as a binder for the negative electrode plate. Other than that, a lithium ion secondary battery was produced in the same manner as in Working Example 1.

WORKING EXAMPLE 7

In contrast to Working Example 1, $TiSi_2$ was used as a negative electrode active material and polyacrylic acid was used as a binder for the negative electrode plate. Other than that, a lithium ion secondary battery was produced in the same manner as in Working Example 1.

COMPARATIVE EXAMPLE 1

In contrast to Working Example 1, the center core member 2 was not inserted. Other than that, a lithium ion secondary battery was produced in the same manner as in Working Example 1.

COMPARATIVE EXAMPLE 2

In contrast to Working Example 1, instead of the armoring can 4, a bag made of a laminated resin film was used to seal the opening thereof by thermally welding. Other than that, a lithium ion secondary battery was produced in the same manner as in Working Example 1.

COMPARATIVE EXAMPLES 3 AND 4

In contrast to Working Examples 7 and 8, the center core member 2 was not inserted. Other than that, a lithium ion secondary battery was produced in the same manner as in Working Examples 7 and 8.

Ten batteries were selected from obtained batteries and charge and discharge cycles of the 10 batteries were performed in room temperature in the following manner. First, constant-current charge was performed at a constant current of 700 mA until a terminal voltage reached 4.2 V. Then, constant-current charge was performed at a constant current of 4.2 V until a current value reached 70 mA. Subsequently, discharge was performed at a constant current of 700 mA until the terminal voltage reached 3.0 V. With this series of steps assumed as one cycle, internal resistance in each of the batteries was measured using an AC impedance method at 1 KHz and average values were compared. Results are shown in a table of FIG. 4.

The results show that, compared to Comparative examples 1, 3 and 4 in which the center core member 2 was not provided, in a battery of each of the working examples of the present invention, increase in internal resistance of a battery was suppressed. In comparison between batteries of Working Examples 7 and 8 in which an active material containing as an element at least one of Si and Sn was used as a negative electrode plate and batteries of Comparative examples 3 and 4 in which the center core member 2 was not provided, differences in resistance value were remarkable. This shows that the present invention has excellent effects.

In Working Example 3 in which PVDF with a small Young's modulus was used, the effects of the present invention were reduced and thus internal resistance in the battery was slightly increased. However, because PVDF is a material which swells in an electrolyte, force was applied by swelling in the direction in which a winding core hole of the electrode group 3 was expanded and thus increase in internal resistance of the battery was not so remarkable. Moreover, in contrast to Working Example 3, in a battery of Working Example 5 in which the center core member 2 was formed so as to have a wedge shape in which force was applied in the direction in which a winding core hole of the electrode group 3 was expanded, internal resistance of the battery was hardly changed. However, it was found that Working Example 5 has a secondary effect, i.e., an electrode group can be easily inserted in a winding core hole.

Although not described in the table of FIG. 4, in Working Example 1 in which a material with a Young's modulation of 210 GPa was used, slight deformation of the armoring can 4 was observed after charge and discharge cycles. A possible reason for this is that when the center core member 2 has a large Young's modulus, deformation for absorbing deflection of an electrode plate becomes difficult. Thus, deformation of the armoring can 4 occurred.

In Comparative example 2 in which instead of the armoring can 4, a bag made of a laminated resin film was used, internal resistance of the battery was largely increased. This is because even though the center core member 2 had the function of expanding the winding core hole 6, the bag in which the electrode group 3 was accommodated could not push back and, as a result, a press effect, i.e., the effect of suppressing deflection of an electrode plate lacked. Therefore, a structure in which the electrode group 3 is accommodated has to be the armoring can 4 or the like (specifically, a product made of metal, resin or the like) which can take balance of stress with the center core member 2.

The present invention has been described referring to the preferred embodiments. The description in the embodiments does not limit the present invention and, as a matter of course, various modifications are possible. For example, in the above-described embodiments, the description has been made using a lithium ion battery as an example. However, even if the present invention is applied to some other nonaqueous electrolyte secondary battery such as a nickel-metal hydride storage battery and the like, the same effects can be achieved. Note that a "rectangular flat secondary battery" refers to a battery having a structure in which a spirally wound electrode group is compressed and deformed into a flat shape and then accommodated in an armoring can and is not defined by a shape of an armoring can itself.

Industrial Applicability

As has been described, the present invention is useful for a high capacity rectangular flat secondary battery in which increase in internal resistance the battery was suppressed.

The invention claimed is:

1. A method for producing a rectangular flat secondary battery, the method comprising the steps of:
   a) spirally winding a positive electrode plate and a negative electrode plate with a separator interposed therebetween, thereby forming an electrode group having a circular shape or an oval shape;
   b) inserting a center core member for applying a pressure to the electrode group in a winding core hole of the electrode group;
   c) compressing the electrode group to deform the electrode group into a rectangular substantially flat shape;
   d) accommodating the electrode group in a rectangular flat armoring can with a base; and
   e) sealing an opening portion of the armoring can.

2. The method of claim 1, characterized in that a negative electrode substance formed on the negative electrode plate is made of a compound containing at least one of Si and Sn.

3. The method of claim 1, characterized in that the center core member is made of an elastic body having a plate shape and a Young's modulus of $2.0 \times 10^{-3}$ GPa or more.

4. The method of claim 3, characterized in that the plate-shape elastic body is formed so as to have a wedge shape.

5. The method of claim 3, characterized in that the plate-shape elastic body is made of a material which absorbs an electrolyte and swells.

6. The method of claim 5, characterized in that the material which absorbs an electrolyte and swells includes polyvinylidene fluoride, styrene-butadiene copolymer, or acrylonitrile butadiene styrene copolymer.

7. The method of claim 1, characterized in that the center core member is made of an elastic body formed so as to have a C-shape.

8. The method of claim 1, characterized in that the center core member is made of a member including a spring for applying a pressure to the electrode group.

* * * * *